(12) United States Patent
Lynch

(10) Patent No.: US 8,924,844 B2
(45) Date of Patent: Dec. 30, 2014

(54) OBJECT ANNOTATION

(75) Inventor: Thomas W. Lynch, Galveston, TX (US)

(73) Assignee: Visual Cues LLC, Las Vegas, NV (US)

( * ) Notice: Subject to any disclaimer, the term of this patent is extended or adjusted under 35 U.S.C. 154(b) by 1442 days.

(21) Appl. No.: 11/685,685

(22) Filed: Mar. 13, 2007

(65) Prior Publication Data

US 2008/0229185 A1 Sep. 18, 2008

(51) Int. Cl.
*G06F 17/24* (2006.01)

(52) U.S. Cl.
CPC .................. *G06F 17/241* (2013.01)
USPC .......................... 715/230; 715/233

(58) Field of Classification Search
USPC ................................ 715/230, 233
See application file for complete search history.

(56) References Cited

U.S. PATENT DOCUMENTS

| | | | | |
|---|---|---|---|---|
| 5,982,399 | A * | 11/1999 | Scully et al. | 345/522 |
| 6,262,728 | B1 * | 7/2001 | Alexander | 345/440.1 |
| 6,597,378 | B1 * | 7/2003 | Shiraishi et al. | 715/764 |
| 6,788,982 | B1 * | 9/2004 | Lapstun et al. | 700/94 |
| 6,877,137 | B1 * | 4/2005 | Rivette et al. | 715/230 |
| 7,257,769 | B2 * | 8/2007 | Caspi | 715/233 |
| 7,756,970 | B2 * | 7/2010 | Ebert et al. | 709/224 |
| 7,848,493 | B2 * | 12/2010 | Samadani | 379/73 |
| 2002/0083094 | A1 * | 6/2002 | Golovchinsky et al. | 707/512 |
| 2002/0116420 | A1 * | 8/2002 | Allam et al. | 707/526 |
| 2004/0205545 | A1 * | 10/2004 | Bargeron et al. | 715/512 |
| 2005/0060356 | A1 * | 3/2005 | Saika | 707/204 |
| 2005/0192854 | A1 * | 9/2005 | Ebert et al. | 705/7 |

FOREIGN PATENT DOCUMENTS

WO WO 99/46702 * 9/1999 ............ G06F 17/30

OTHER PUBLICATIONS

Microsoft Computer Dictionary; May 1, 2002; Microsoft Press; Fifth Edition; p. 102.*
Deitel et al.; Java: How to Program; 2002; Prentice Hall Publishing; Fourth Edition; pp. 288-291 and 601-642.*
Ivanov; API Hooking Revealed; Dec. 2, 2002; CodeProject; pp. 1-16.*
Phoenix et al; Learning Perl; Jul. 18, 2001; O'Reilly Media, Inc.; Third Edition; pp. 12-17, 297, and 301.*

* cited by examiner

*Primary Examiner* — Andrew Dyer
(74) *Attorney, Agent, or Firm* — Schwabe Williamson & Wyatt

(57) ABSTRACT

Soft-screen annotations are associated with objects in order to communicate information relating to the object. The annotation can be static or dynamic and/or interactive or non-interactive. Different properties can be selected when a soft-screen annotation is created in order to customize the annotation for each object.

32 Claims, 2 Drawing Sheets

OBJECT ANNOTATION

BACKGROUND

Embodiments of the invention relate to the field of objects, and more specifically to annotations associated with objects.

Shortly before the launch of Apollo 11, a hazardous situation was discovered to exist when a particular switch on a control panel was actuated at the wrong time, even though actuating the switch at the critical time appeared to be harmless. Because there was insufficient time before launch for a design modification, a supervising engineer relied on a simple social-engineering technique of taping a piece of paper to the control panel on which a message was handwritten not to throw the switch at the wrong time. It so happened that the warning message was attached to the control panel along with a number of other previously attached notes providing various warnings.

During the Apollo 13 mission, command-module operator Jack Swigert attached a note on the release switch for the Lunar Lander in order to remind himself not to accidentally send the rest of the crew off into space.

As useful as notes on control panels have been, computerized control panels that are currently in use present a difficulty for such panel notes. Notes written directly on computer screens can be difficult to erase, and any dynamic changing of underlying display windows can cause such marks to be orphaned.

To illustrate such a situation, consider, for example, a control system for a piece of equipment or for a factory environment having a computer-screen type display for a control panel instead of a mechanical-type control panel. When an operator wants to leave a note or a message for another operator that identifies, for example, optimum settings, settings to avoid, and/or explains control configurations for particular events, the technique of using notes taped to the control screen and/or notes written on the control screen using, for example, a wax pencil could be potentially disastrous. While using a wax pencil allows notes and messages to be written directly on the display screen, the notes and messages can become orphaned or point to inappropriate places when the underlying display on the screen changes.

Now that computers and display screens are so widespread, more users are experiencing various problems associated with annotating a computer screen. For example, consider a computer user who attached a note to the screen of their computer in order to remind the user to turn the printer on before selecting the print button, thereby avoiding locking up the computer. As another example, consider an office environment in which the "cancel scan" button for a hypothetical application ImageObtain is used for continuing a scan option. Accordingly, each user becomes stuck when wanting to continue scanning from the plate to the feeder and interrupts a worker sitting nearby the computer for guidance. In another case, a teacher of a fast-paced course is having difficulty explaining to students the correlation between what he is saying and what is being displayed on a computer screen. In all of these examples, control-panel-type annotation would solve the problem, but such a solution cannot be implemented because the control panel is displayed on a computer screen.

BRIEF DESCRIPTION OF DRAWINGS

Subject matter is particularly pointed out and distinctly claimed in the concluding portion of the specification. Claimed subject matter, however, both as to organization and method of operation, together with objects, features, and advantages thereof, may best be understood by reference of the following detailed description when read with the accompanying drawings in which:

DETAILED DESCRIPTION

Figure 1:
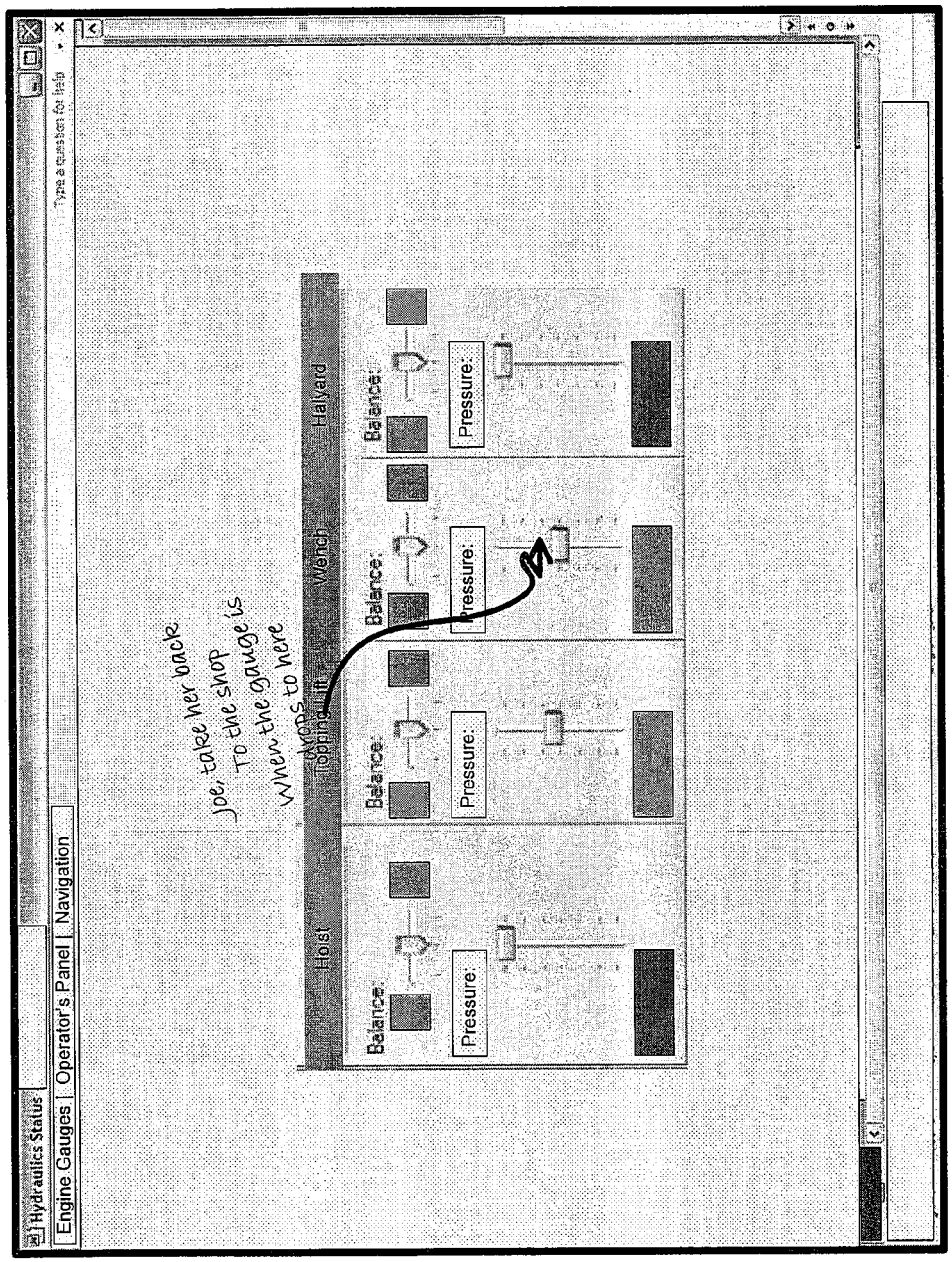
FIG. 1 depicts an exemplary situation in which an annotation inappropriately remained on a display screen 100 after the underlying display has changed.

In the following detailed description, numerous specific details are set forth to provide a thorough understanding of the claimed subject matter. It will, however, be understood by those skilled in the art that the claimed subject matter may be practiced without these specific details. In other instances, methods, procedures, components and/or circuits that would be known by one of ordinary skill have not been described in detail so as not to obscure the claimed subject matter.

Reference throughout this specification to "one embodiment" or "an embodiment" means that a particular feature, structure, or characteristic described in connection with the embodiment is included in at least one embodiment of claimed subject matter. Thus, the appearances of the phrase "in one embodiment" and/or "an embodiment" in various places throughout this specification are not necessarily all referring to the same embodiment. Furthermore, the particular features, structures, and/or characteristics may be combined in one or more embodiments. Further, the word "exemplary" is used herein to mean "serving as an example, instance, or illustration." Any embodiment described herein as "exemplary" is not necessarily to be construed as preferred or advantageous over other embodiments.

A "Graphical User Interface" (GUI) as referred to herein may mean one or more user interfaces for interacting with one or more systems, such as a computer system, a computing platform, a semiconductor device, a portable computer, a personal digital assistant, and/or other system, such as an interface comprising one or more graphical representations and/or depictions that a user may interact with by using one or more input devices, for example. In this context, a GUI may comprise a computer program which may be stored in a variety of ways, such as static and/or dynamic random access memory, read-only memory, and/or a hard drive, for example. Additionally, a GUI may be downloadable from a computer network, such as an intranet, extranet, and/or a worldwide computer network, for example. By way of example, a GUI may comprise a web page, such as a hypertext markup language and/or extensible markup language compatible document, that may include one or more executable programs, modules, and/or objects, such as a Macromedia Flash and/or Java compatible program, though, of course, these are merely illustrative example and claimed subject matter is not limited in this regard.

A "graphical representation" and/or a "graphical depiction" as referred to herein may mean one or more elements displayed, such as with one or more display devices in conjunction with one or more of the above-mentioned systems and/or a GUI, for example. In this context, a user of the GUI, such as an administrator, may, at least in part, interact with the graphical representations and/or graphical depictions using one or more input devices, for example.

"Instructions" as referred to herein relate to expressions which represent one or more logical operations. For example, instructions may be "machine-readable" by being interpretable by a machine for executing one or more operations on one or more data objects, such as, for example, a processor. This is, however, merely an example of instructions and claimed subject matter is not limited in this respect. In another example, instructions as referred to herein may relate to encoded commands that are executable by a processor or other processing circuit having a command set which includes the encoded commands. Such an instruction may be encoded in the form of a machine language understood by the processor or processing circuit. Again, these are merely examples of an instruction and claimed subject matter is not limited in these respects.

"Storage medium" as referred to herein relates to media capable of maintaining expressions that are perceivable by one or more machines. For example, a storage medium may comprise one or more storage devices for storing machine-readable instructions and/or information. Such storage devices may comprise any one of several media types including, for example, magnetic, optical and/or semiconductor storage media. These are, however, merely examples of a storage medium and claimed subject matter is not limited in these respects.

"Logic" as referred to herein relates to structure for performing one or more logical operations. For example, logic may comprise circuitry that provides one or more output signals based at least in part on one or more input signals. Such circuitry may comprise a finite state machine that receives a digital input signal and provides a digital output signal, or circuitry that provides one or more analog output signals in response to one or more analog input signals. Such circuitry may be provided, for example, in an application specific integrated circuit (ASIC) and/or a field programmable gate array (FPGA). Also, logic may comprise machine-readable instructions stored in a storage medium in combination with a processor or other processing circuitry to execute such machine-readable instructions. These are, however, merely examples of structures which may provide logic and claimed subject matter is not limited in these respects.

Unless specifically stated otherwise, as apparent from the following discussion, it should be appreciated that throughout this specification discussions utilizing terms such as "processing," "computing," "calculating," "selecting," "forming," "enabling," "inhibiting," "identifying," "initiating," "querying," "obtaining," "hosting," "maintaining," "representing," "modifying," "receiving," "transmitting," "storing," "authenticating," "authorizing," "hosting," "determining" and/or the like refer to the actions and/or processes that may be performed by a computing platform, such as a computer or a similar electronic computing device, that manipulates and/or transforms data represented as physical, electronic and/or magnetic quantities and/or other physical quantities within the computing platform's processors, memories, registers, and/or other information storage, transmission, reception and/or display devices. Accordingly, a computing platform refers to a system or a device that includes the ability to process and/or store data in the form of signals. Thus, a computing platform, in this context, may comprise hardware, software, firmware and/or any combination thereof. Further, unless specifically stated otherwise, a process as described herein, with reference to flow diagrams or otherwise, may also be executed and/or controlled, in whole or in part, by a computing platform.

A "Computer Program" as referred to herein relates to an organized list of instructions that, if executed, results in or causes a computer, computing device and/or machine to behave in a particular manner. Here, for example, a computer program may comprise machine-readable instructions that are executable to perform one or more desired tasks. In one particular embodiment, although claimed subject matter is not limited in this respect, a computer program may define input data and output data such that execution of the program may provide output data based, at least in part, on the input data. These are, however, merely examples of a computer program and claimed subject matter is not limited in these respects.

An "Application" as referred to herein relates to a computer program or group of computer programs capable of providing a result and/or action. In a particular embodiment, for example, such an application may comprise a program that performs desired tasks in support of an enterprise, although claimed subject matter is not limited in this respect. For example, an application may comprise one or more end-user programs, such as database programs, spreadsheet programs, and/or word processor program, that are accessible through a network browser, electronic mail, interactive games, video and/or image processing programs, calendars, financial application software, inventory control systems and/or the like. These are, however, merely examples of an application and claimed subject matter is not limited in these respects.

The subject matter disclosed herein provides annotations that may be efficiently and intuitively associated with and connected to items on a computer screen. Exemplary annotations include, but are not limited to, one or a combination of, handwriting, text, drawings, word processor files, drawing program files, spreadsheets, sound files, video files, interactive and non-interactive programs, or any application that can render into an annotation window.

As one general example, annotations can be used to communicate the unexpected behavior of control buttons for reminding a user of an unusual situation—a situation that was not envisioned when the application program was developed. Such notes will be directly useful as more craft and weapons systems evolve from hard control panels to computer screens. Everyday computer users will find display annotations useful for keeping track of program kinks and personalities. Similarly, managers, teachers, and team members will find display annotations useful for coordination. Other uses of screen annotations include, but are not limited to, general documentation of software bugs, notes from teachers for students, notes for software developers regarding program improvements and features, notes from managers to programmers, notes between programmers, and the communication of tips and kinks between users.

FIG. 1 depicts an exemplary situation in which an annotation inappropriately remained on a display screen 100 after the underlying display has changed. In FIG. 1, System Operator John left a wax-pencil note for System Operator Joe indicating the minimum fuel level that is adequate for returning to the shop. Unfortunately, the profile for Operator Joe initially opens the display to a display relating to hydraulics information. The profile for Operator Joe places fuel information in a different and smaller location than the profile for Operator John. Accordingly, Operator John's wax-pencil annotation confusingly points to a hydraulic pressure monitor level that should not be a reason for returning to the shop. Should Operator Joe change the display to display fuel information, Operator John's annotation would still be placed inappropriately because the profile for Operator Joe places gauges in a different place than for Operator John.

According to the subject matter disclosed herein, soft-screen annotations track features of a windowing display system and remain in an appropriate location when the windowing display changes. In one exemplary embodiment, soft-screen annotations may be attached to program system calls to widgets for displaying information. To illustrate this, consider the situation depicted in FIG. 1. The fuel monitoring application includes, for example, a reference to an appropriate symbol or address for displaying fuel information, or a widget call to "call bar_widget", such as depicted by the following exemplary pseudo-code:

```
add ax, bx
call bar_widget
```

In this particular case, the widget call to "bar_widget" is a call to a program from a dynamic link library (DLL) that functions to display a bar graph for the fuel information on the screen. For example, "bar_widget" may be the widget that the fuel monitoring application uses for displaying the fuel gauge. In order to attach the soft-screen annotation, the exemplary pseudo-code might be:

```
add ax, bx
call annotated_bar_widget
```

Thus, when the fuel monitoring application calls bar_widget on the display screen, the application will actually call annotated_bar_widget, which displays the soft-screen annotation in association with the bar graph for the fuel information.

To utilize a soft-screen annotation according to the subject matter disclosed herein, Operator John would associate, or attach, a soft-screen annotation to the call that places the bar widget on the screen for the fuel gauge. The soft-screen annotation only appears when the fuel gauge is rendered. Moreover, the call to "annotated_bar_widget" includes information for placing the bar widget; consequently, placement of the soft-screen tracks placement of the bar widget on the screen. Accordingly, the soft-screen annotation may be hidden or reduced to an icon when the fuel gauge is hidden.

In another exemplary embodiment, the original binary code for the program placing widgets or other graphical items on a screen is not modified, instead, the DLL holding the "bar_widget" library routine is replaced with another dynamic library routine that also appears to have a "bar_widget." In the replacement DLL, however, the routine called "bar_widget" is really the code for "annotated_bar_widget." In this case, the "annotated_bar_widget" library routine examines the input operands and, perhaps, a call stack for determining which soft-screen annotation, if any, is appropriately placed on the display with the rendered widget.

In another exemplary embodiment, an application developer may modify the fuel monitoring application to make explicit use of annotation-rendering widget libraries. In which case, the annotation-rendering library routines explicitly indicate the soft-screen annotations for display and when to display the soft-screen annotation. In the explicit soft-screen annotation-rendering widget library, each widget accepts an input operand that helps locate the appropriate soft-screen annotation.

In yet another exemplary embodiment, a central annotation database or a distributed annotation database are owned by, for example, an annotation server that stores annotations is accessed by a routine and/or widget that render items on a screen for determining the particular annotation to display and when to display the annotation. Alternatively, the contents of such an annotation database may be combined with one or more graphics databases. Further, the functionality of the annotation server may be integrated with the functionality of a graphics server.

In general, the term "render" as used herein means introducing an object into any context of any kind, not merely rending the object on a graphical display screen. As examples of introducing an object into a context, that is, rendering an object as the term "rendering" is used herein, an object may be considered to be rendered when, but not limited to, the object is returned from an SQL database query, when an object is communicated over a communications network, when an object appears in a SCSI transaction, and when an object is placed in a cache. When a soft-screen annotation associated with an object is rendered, the context mode is appropriate for rendering the annotation in relationship to the object.

For example, in a Unix-based system, a window manager application may check for annotations at the time objects are rendered on a display screen. Should the window manager application determine that an object has an associated soft-screen annotation and the mode is appropriate, the window manager application may open a window for the annotation. Other possible implementations of rendering include, but are not limited to, operating system support, a special application layer that monitors rendering calls, an extra layer over all calls that as a side effect renders the annotation and then calls the original rendering function, direct application support.

In another exemplary embodiment of the subject matter disclosed herein, a companion program is invoked when an annotated object is rendered, or the annotation itself may be a program that is invoked directly. An exemplary companion program could be an annotation manager application that would be called with appropriate arguments so that the annotation manager application may locate the annotation source and properly render the annotation. The annotation manager application may run in a well-known application, such as a word processor or a graphical display application, in order to create the textual-based content, graphical-based content, image-based content, multimedia-based content and/or a program-based content of the annotation. In addition, the rendered annotation may appear in a window comprising a title and possibly selection buttons. As the rendered annotation contains graphical objects, these graphical objects may in turn be annotatable. Alternatively, such an annotation manager may be embodied as a server. It should be understood that an object could alternatively comprise textual-based content, graphical-based content, image-based content, multimedia-based content and/or program-based content.

Figure 2:
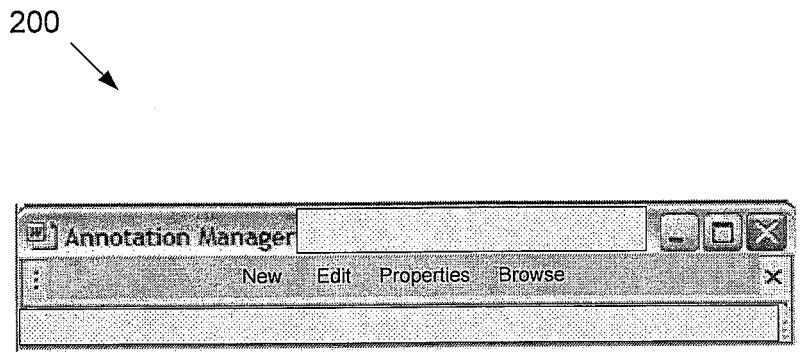
FIG. 2 shows an exemplary annotation manager window that appears on a portion of a display screen when the annotation manager is invoked.

According to the subject matter disclosed herein, a user is able to create, modify, delete, save and share soft-screen annotations. In one exemplary embodiment, a user utilizes an annotation manager to assist with these functions. FIG. 2 shows an exemplary annotation manager window 200 that appears on a portion of a display screen when the annotation manager is invoked. Exemplary annotation manager window 200 allows a user to select various exemplary functions, such as "New," "Edit," "Properties," and "Browse," which are described below. While annotation manager window 200 depicts graphical-based function selectors, it should be understood that annotation manager functions could be selected using a graphical-based tool bar, a graphical-based button and/or an input field. Further, it should be understood that properties and features for an annotation could also be selected using a graphical-based tool bar, a graphical-based button and/or an input field.

Figure 3:
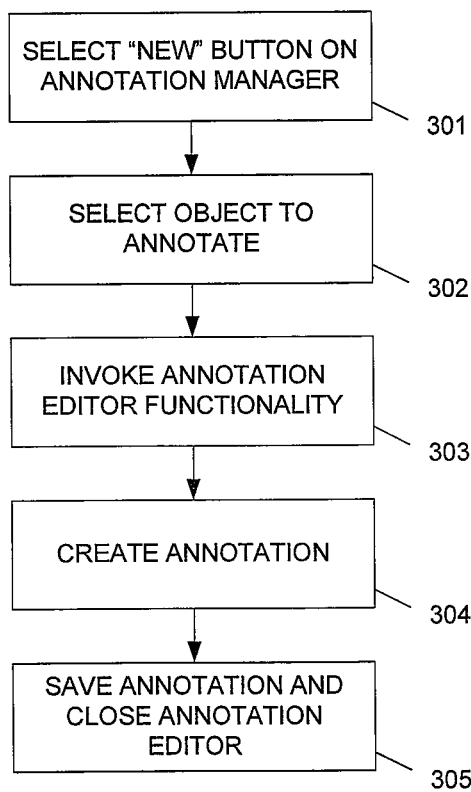
FIG. 3 depicts an exemplary procedure for creating a new soft-screen annotation according to the subject matter disclosed herein

With reference to the exemplary annotation manager window depicted in FIG. 2, FIG. 3 depicts an exemplary procedure 300 for creating a new soft-screen annotation according to the subject matter disclosed herein. At step 301, the user selects the "new" button from the annotation manager in a well-known manner using a user input device, such as by using a mouse button to click on "New" or by entering a predetermined sequence of key strokes. The following description is directed to use of a mouse; however, it should be understood that other user input devices, such as, but not limited to, a trackball button and a touchscreen sensor, can be used in a well-known manner to achieve the same or similar result. In one exemplary embodiment, the cursor then changes to show that the annotation manager functionality is active. At step 302, the user moves the cursor in a well-known manner to position the cursor over the object that the user intends to annotate, and then clicks on or selects the object. If more than one object is nested, the user may need to, for example, click multiple times to scroll through to the desired object. At step 303, the user right clicks and an annotation editor appears (not shown in FIG. 2). At step 304, the user creates the desired annotation. At step 305, the user saves the annotation and closes the annotation editor. The cursor returns to normal, and the annotation is displayed in associated with the object on the display screen.

In one exemplary embodiment, a soft-screen annotation includes one or more predetermined default properties. In one exemplary embodiment, soft-screen annotation properties may be changed by using the annotation manager in manner similar to creating a soft-screen annotation described in FIG. 3. For example, the user selects a "Properties" button, such as the properties button shown on the annotation manager depicted in FIG. 2, and then positions the cursor over the soft-screen annotation that is to have its properties modified. At this point, a properties editor (not shown) is invoked, and the user changes properties of the soft-screen annotation in a well-known manner.

In one exemplary embodiment, soft-screen annotations are stored in a user or system folder. Accordingly, such a folder may contain many subfolders. The browse option, selected by a "Browse" button like that shown in FIG. 3, allows a user to view the contents of the folders containing soft-screen annotation in a manner similar to using a Windows-Explorer-type browsing application to browse files. Because soft-screen annotations could be embodied as html documents, browsing soft-screen annotations could be like browsing websites. Additionally, a user could create an extended encyclopedia of information relating to various graphical objects and/or histories or journals of use. Use journals could be audited or perhaps even replayed. In addition to or alternatively to a browsing a hierarchical organization of soft-screen annotations, browsing may allow a user to look through soft-screen annotations that have been added and removed from objects over time and by various people for the benefit of other people. In one exemplary embodiment, browsing may show which soft-screen annotations are available in which annotation modes. In another exemplary embodiment, browsing may allow a user to see all properties and their corresponding values that have been assigned to soft-screen annotations.

In one exemplary embodiment, the annotation editor produces an annotation source file. In another exemplary embodiment, the annotation source is implemented as a recursive property value list. In yet another exemplary embodiment, a soft-screen annotation is held within the annotation manager. In still another exemplary embodiment, a soft-screen annotation is compiled into an application program. In yet another exemplary embodiment, different soft-screen annotations have different source formats and/or are stored in different databases.

When a recursive property value list is used, properties, or attributes, in the annotation source may be divided into two or more groups, e.g., as annotation system internal properties, and as user-defined properties. Annotation system internal properties may be distinguished from user-defined properties by using reserved property words, or through the use of property attributes (i.e., properties on properties). For example, an attribute used for denoting an annotation system internal property could be "system," while that of a user property could be "user."

In general, a property value list may be expressed in documentation, or even sometimes in actuality, using a parenthetic list. The head of the list is the property, while the second and remaining elements in the list are the value or values. When a property has an attribute (i.e., an extending property), the property appears as a list, in which the head is the property name, and the tail the attribute or attributes. Note, recursive property value lists may be arbitrarily deep. Similarly, property value lists may appear as values for a given property. It is convenient to document such lists using a text image, but in an actual implementation, either a text image or other forms, such as a binary image, is typically be used. A binary form for such a list should be accompanied by an appropriate Application Programming Interface (API) for accessing and manipulating the list. While the binary form is more cumbersome, at the same time the binary form is typically more compact.

Soft-screen annotations may be implemented in a more restrained manner, or in a completely different manner. All representations, however, must be capable of expressing both the contents of the soft-screen annotation, and the object to which the soft-screen annotation is attached, even though the contents and the object may not be present on the screen. Soft-screen annotations comprise content information and linking information. Linking information comprises an identification of the soft-screen annotation and an identification of the object to which the soft-screen annotation is attached. The content information and the linking information is independent of what is rendered on a screen at a given time. In one exemplary embodiment, content information and linking information could be created separately and/or at different times. In this regard, a partial soft-screen annotation that, for example, is lacking one or more components that are needed for completion could be saved for later completion. Note, this is a discussion of the internal representation for the annotation, it is contemplated that the typical user will make use of a GUI tool, such as an annotation manager, or annotation composer, to create this internal form as a side affect. The typical user may not ever see the internal representation.

An exemplary annotation property value list internal form might appear as:

```
(annotation-property-value-list
    ((profile system) UserAnnotationProfile)
    ((annotation-application system) WordProcessor97)
    ((title system) "Watch Out")
    ((summary system) "Don't press start scan when red light is lit.")
    ((source-text system) annotationFile.doc)
    ((attachto system) ((application ImageObtain3.0) menu2 scan))
)
```

The head of this exemplary property value list indicates that it is a property value list, and is shown for clarity. The remaining elements are the properties and their associated values. The first property profile specifies a context for interpreting this list. Such a context may contain user preferences, default applications, etc. All, part, or none of the context may, for example, be inherited from the computer environment and/or registry for the user. The system qualification indicates that the profile is to be interpreted as an annotation system keyword, not as a user defined property. The attach to system property comprises a soft-screen annotation link.

The second property of this exemplary list, annotation-application, specifies the application that is used for manipulating that annotation source-text. The source-text is the source file containing text or a drawing, though it may be any arbitrary argument that is meaningful to the annotation-application. In this particular example, the source-text is a hypothetical WordProcessor97 file. Additionally, there is both a summary and a source file. Different annotation managers may handle such a situation differently, for example by showing the summary at times, and by showing the contents of the file at other times.

Most soft-screen annotations are attached to an object in the system. For the exemplary property value list above, an annotation is attached to a button on the menu for the hypothetical application ImageObtain. Such an annotation may warn a user not to push a particular button when a scanner is not ready.

Other properties that may or may not be used include, but are not limited to, a duration property indicating a duration for which the annotation should remain on a display screen, a calendar-time property for how long the annotation should remain in effect, a priority property indicating a level of priority for the annotation, a verbosity property indicating a level of verbosity for the annotation (the user could then specify a verbosity level), a user viewability property indicating which users may see the annotation, a shared property indicating whether the annotation will be shared over the network. As an exemplary embodiment of the verbosity property, a user creating an annotation may provide multiple annotations of varying verbosity. Simple annotations may even be inherited. For example, a short annotation (low verbosity level) may be just an icon. When a viewing user clicks on the icon, a higher verbosity message is provided. Should the viewing user select a higher verbosity level, an even longer message may be provided. The viewing user who is given a control panel for annotations (as part of an annotation manager) may select a default verbosity level. When the default is very low, all annotations may appear as icons by default, when the default is very high, the longest annotation may be presented by default. It should be understood that the verbosity property comprises, but is not limited to, a selectable level of content that is based at least in part on at least one of a predetermined clock time, a predetermined time window, a predetermined calendar date, a predetermined range of calendar dates, a predetermined user, a predetermined group of users, and at least one predetermined event.

Properties may carry other attributes, or properties, in addition to or alternatively to system and user attributes. For example, properties may be tagged as being XML objects having properties that may then be used to document the annotations in a manner that they may be searchable, even over the World Wide Web.

In one exemplary embodiment, soft-screen annotations have a system property for setting a mode of operation, for example, a set-mode property, allowing a user to be able to associate with the set-mode property to zero, one or a number of mode names. Accordingly, a user sets one or more operating modes by using, for example, the annotation manager. Then, only annotations of the selected mode will be rendered when the associated object is rendered.

For example, suppose a student is studying how to use a word processing application. The student might create a mode called, for example, LearnWordprocessor. The student then might create a number of soft-screen annotations on application buttons that correspond to lecture notes taken by the student. In one exemplary embodiment, after using the annotation manager to create annotations, the annotation source file might contain the line:

((set-mode system) LearnWordprocessor)

The student would then set the operating mode for the soft-screen annotations, for example, through an annotation manager. If the student adds LearnWordprocessor to the operating-mode list, all of the LearnWordprocessor annotations would appear when their associated objects are rendered. If the student did not add LearnWordprocessor to the operating mode, then all of the LearnWordprocessor annotations would not appear when the corresponding objects are rendered.

As another example, a software developer may annotate an application with notes that respectively fall into beginner, intermediate, and expert modes. Consequently, a soft-screen annotation, such as exemplary pseudo-code below, would cause the soft-screen annotation "for experts only" to appear only when the operating mode list contained beginner or intermediate.

(
((summary system) "for experts only")
((set-mode system) beginner intermediate)
)

As set forth, modes have been invoked through matching property values. It should be understood that modes could additionally and/or alternatively be invoked through use of an arbitrary Boolean function. Such a function would be defined in the soft-screen annotation, accept the mode list as input, and/or any other data the user found interesting, and then return "true" or "false." An example of such a function would be a function that accepts the system mode list, tests for matches among the set-mode values, and returns "true" if a match is found.

The repertoire of annotatable objects on a given computer system may be expanded to include application data such as, but not limited to, text objects in a word processor, or cells in a spreadsheet. In a fully annotatable system, all objects that a user may refer to, in any manner, may be annotated.

When an annotation manager is used, the annotation manager facilitates a user in calling the desired applications, or in gathering objects selected from various applications. Also, the annotation manager facilitates a user in creation and attachment of soft-screen annotations to selected objects.

In one exemplary embodiment, soft-screen annotations may be shared among users. A shared soft-screen annotation may appear as a file, an object and/or any other transportable unit that is exchanged over a network, through removable media, and/or by communication technique between users. If an annotation manager or similar program is used, special features may be provided for installing and/or removing soft-screen annotation groups, including shared soft-screen annotations.

Thus far, the description of soft-screen annotations has focused on a static form of annotation, that is, a form of annotation that renders a message by, for example, calling more annotations, and then does little more. As was noted, however, annotations may, optionally, be programs, that is, annotations may be dynamic.

Consider the following example in which a user decided that it made sense to run a drawing application without a companion hypothetical program FontProducer. Such a user could annotate the drawing application so that when the drawing application appeared on the screen, the hypothetical program FontProducer is invoked through the annotation. It is possible that, in turn, the hypothetical program FontProducer could have annotations that are invoked when FontProducer is rendered. If the user would like the two programs invoked together only when working on a specific project, the user could create an annotation mode for the project. In an extensive embodiment, a soft-screen annotation could comprise at least one of textual-based content, graphical-based content, image-based content multimedia-based content and/or a program-based content. In the case that a soft-screen annotation linked to an object may be an arbitrary program, then when the annotation linked to a program is rendered, perhaps after clicking on the lower verbosity icon, then the program linked to the object would run.

According to the subject matter disclosed herein, a soft-screen annotation can be non-interactive or interactive. An interactive soft-screen annotation may take from and/or add to the content of the object being annotated. For example, suppose a word processor has a bug that causes a word-transpose function to fail, but only when the word is italicized. If for example, the word-transpose function is selected for non-italicized text "animal red" results in "red animal", but when the same italicized text is selected for the word-transpose function, nothing happens. An exemplary interactive annotation may be added to the word-transpose function button that, for example, reads "This function is broken when italicized words are selected. As a temporary fix, click *here* to transpose selected italicized words."

In one exemplary embodiment, an interactive soft-screen annotation is implemented, for example, by application APIs. The annotation creator would provide code, for example, through an annotation composer that could be part of an annotation manager that calls the API of the word processor and performs the desired function. The interactive-annotation code would be invoked from, for example, a button, link, or other command interface in the annotation. Such annotations may be interpreted at run time, or may require pre-compilation.

In the preceding description, various aspects of claimed subject matter have been described. For purposes of explanation, specific numbers, systems and/or configurations were set forth to provide a thorough understanding of the claimed subject matter. It should be apparent, however, to one skilled in the art having the benefit of this disclosure that claimed subject matter may be practiced without the specific details. In other instances, features that would be understood by one or ordinary skill were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

The invention claimed is:

1. A method, comprising:
   selecting, by a computing device, an object rendered on a display, wherein the object is associated with an application that includes a first call to a program, wherein the first call is configured to cause the program to render the object on the display;
   receiving, by the computing device, a plurality of annotations associated with the selected object;
   determining, by the computing device, the verbosity level of each annotation of the plurality of annotations, wherein each of the plurality of annotations includes a different verbosity level, and wherein for any two of the annotations associated with the selected object and having different verbosity levels, a first annotation associated with a first verbosity level represents information in a textually-shortened form from information represented in a second of the two annotations with a second verbosity level higher than the first verbosity level, and wherein the first annotation associated with the lower verbosity level comprises an icon; and
   during execution of the application, and prior to execution of the first call, replacing, by the computing device, the first call with a second call to be executed in place of the first call, wherein the second call is different from the first call and is itself configured to both render the plurality of annotations on the display and to cause the program to render the object without requiring execution of the first call, wherein the second call is configured to render the annotations individually based on a requested verbosity level.

2. The method of claim 1, wherein receiving comprises receiving, by the computing device, a static annotation.

3. The method of claim 1, wherein receiving comprises receiving, by the computing device, a dynamic annotation.

4. The method of claim 1, wherein receiving comprises receiving, by the computing device, an annotation that is user non-interactive.

5. The method of claim 1, wherein receiving comprises receiving, by the computing device, an annotation that is user interactive.

6. The method of claim 1, wherein selecting comprises:
   determining, by the computing device, that the object on the display is associated with a graphical cursor image; and
   receiving, by the computing device, an indication that the object has been selected.

7. The method of claim 1, wherein receiving comprises receiving, by the computing device, textual-based content.

8. The method of claim 1, wherein receiving comprises receiving, by the computing device, graphical-based content.

9. The method of claim 1, wherein receiving comprises receiving, by the computing device, image-based content.

10. The method of claim 1, wherein receiving comprises receiving, by the computing device, multimedia-based content.

11. The method of claim 1, wherein selecting comprises selecting, by the computing device, textual content rendered on the display.

12. The method of claim 1, wherein selecting comprises selecting, by the computing device, graphical-based content rendered on the display.

13. The method of claim 1, wherein the selecting comprises selecting, by the computing device, image-based content rendered on the display.

14. The method of claim 1, wherein the selecting comprises selecting, by the computing device, multimedia-based content rendered on the display.

15. The method of claim 1, wherein selecting comprises selecting, by the computing device, program-based content rendered on the display.

16. The method of claim 1, wherein receiving further comprises receiving, by the computing device, a selected property for each of the plurality of annotations.

17. The method of claim 16, wherein receiving the selected property comprises receiving, by the computing device, at least one of a context, a source-text, a visible duration, an association duration, a priority, user viewability, a shared property or a user-definable property.

18. The method of claim 1, wherein receiving comprises receiving, by the computing device, one of the plurality of annotations from a database comprising at least one annotation.

19. The method of claim 1, wherein receiving comprises receiving, by the computing device, one of the plurality of annotations from an annotation manager.

20. The method of claim 19, wherein receiving one the plurality of annotations from the annotation manager comprises receiving, by the computing device, the one annotation from at least one annotation property selector.

21. The method of claim 1, wherein rendering comprises:
associating, by the computing device, a mode with the plurality of annotations; and
rendering, by the computing device, one of the plurality of annotations with the selected object in response to a determination that a system mode matches the mode associated with the one annotation of the plurality of annotations.

22. The method of claim 1, further comprising determining, by the computing device, the requested verbosity level based at least in part on at least one of a predetermined clock time, a predetermined time window, a predetermined range of calendar dates, a predetermined user, a predetermined group of users, and a predetermined event.

23. An article of manufacture including a non-transitory computer-readable medium having instructions stored thereon that, wherein the instructions are configured to cause a computing device, in response to execution of the instructions by the computing device, to perform operations comprising:
selecting an object rendered on a display, wherein the object is associated with an application that includes a first call to a program, wherein the first call is configured to cause the program to render the object on the display;
receiving a plurality of annotations associated with the selected object;
determining the verbosity level of each annotation of the plurality of annotations, wherein each of the plurality of annotations includes a different verbosity level, and wherein for any two of the annotations associated with the selected object and having different verbosity levels, a first annotation associated with a first verbosity level represents information in a textually-shortened form from information represented in a second of the two annotations with a second verbosity level higher than the first verbosity level, and wherein the first annotation associated with the lower verbosity level comprises an icon; and
during execution of the application, and prior to execution of the first call, replacing the first call with a second call to be executed in place of the first call, wherein the second call is different from the first call and is itself configured to both render the plurality of annotations on the display and to cause the program to render the object without requiring execution of the first call, wherein the second call is configured to render the annotations individually based on a requested verbosity level.

24. The article of manufacture of claim 23, wherein receiving comprises receiving a static annotation.

25. The article of manufacture of claim 23, wherein receiving comprises receiving a dynamic annotation.

26. The article of manufacture of claim 23, wherein receiving comprises receiving a user-interactive annotation.

27. The article of manufacture of claim 23, wherein selecting comprises:
determining that the object on the display is associated with a graphical cursor image; and
receiving an indication that the object has been selected.

28. The article of manufacture of claim 23, wherein receiving comprises receiving an annotation that includes textual-based content.

29. The article of manufacture of claim 23, wherein the operations further comprise receiving a selected property for each of the plurality of annotations.

30. The article of manufacture of claim 29, wherein receiving comprises receiving at least one of a context, a source-text, a visible duration, an association duration, a priority, a user viewability, a shared property, or a user-definable property.

31. The article of manufacture of claim 23, wherein the operations further comprise:
associating a mode with each of the plurality of annotations; and
rendering one of the plurality of annotations with the selected object in response to a determination that a system mode matches the mode associated with the one annotation of the plurality of annotations.

32. The article of manufacture of claim 23, wherein the operations further comprise determining the requested verbosity level based at least in part on at least one of a predetermined clock time, a predetermined time window, a predetermined range of calendar dates, a predetermined user, and a predetermined event.

* * * * *